United States Patent Office 2,913,495
Patented Nov. 17, 1959

2,913,495

STABILIZATION OF ARYLAMINES

William F. Goldsmith, South Charleston, W. Va., assignor to Union Carbide Corporation, a corporation of New York No Drawing. Application March 25, 1957
Serial No. 647,991

22 Claims. (Cl. 260—575)

This invention relates to chemical processes. More particularly, it relates to processes for the stabilization of arylamines and stabilized arylamine solutions.

Arylamines, among other uses, can be reacted with diketene to yield acetoacetarylamides. These acetoacetarylamides are used in the manufacture of dyes and pigments and the like. It is essential, therefore, that the acetoacetarylamides have very little color. Arylamines, however, tend to discolor badly upon storage and discolored arylamines will produce discolored acetoacetarylamides, which are useless for most purposes.

Heretofore, with unstabilized arylamines, it has been necessary to remove the color acquired upon storage. This has required frequent redistillation of the amines with consequent added expense and delay and considerable loss of material. It has been suggested to stabilize arylamines by the addition of compounds to inhibit discoloration. The compounds proposed, however, are sulfur-containing compounds which can be detrimental and undesirable particularly in the manufacture of pigments and dyes and the like.

We have now discovered that an arylamine is effectively stabilized against discoloration by the addition of a small quantity of an acetoacetarylamide, which acetoacetarylamide is the reaction product of an arylamine and diketene. This reaction can be illustrated with aniline as follows:

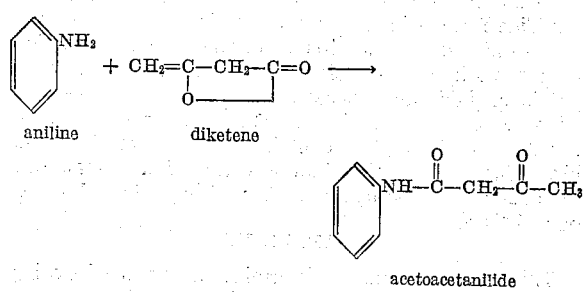

As used herein, the term "arylamine" includes aryldiamines and is intended to include substituted and unsubstituted phenylamines and phenylene diamines:

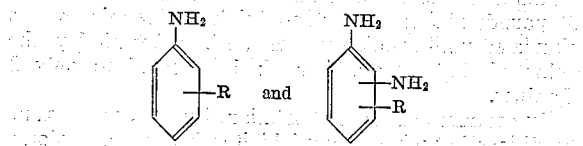

wherein R, if present, and there can be more than one R on the ring, can be lower alkyl, lower alkoxy or a halogen. It also includes naphthylamines:

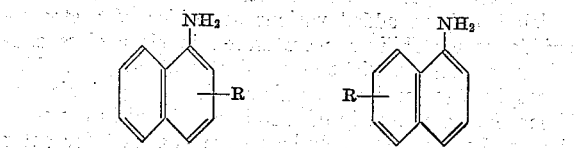

and naphthylene diamines:

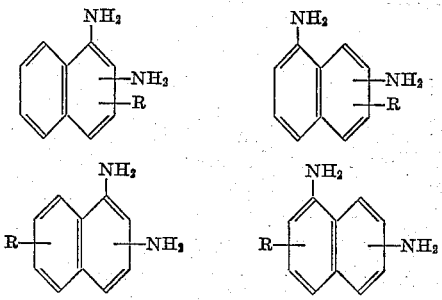

wherein R, if present, and there can be more than one R on the ring, can be lower alkyl, lower alkoxy or a halogen. Likewise, as used herein, the term "acetoacetarylamide" is intended to include the reaction products of any of the above arylamines with diketenes, and thus includes acetoacetphenylamides, acetoacetphenyleneamides, acetoacetnaphthylamides and acetoacetnaphthyleneamides.

In the examples below are illustrated the stabilization of ortho-toluidine, ortho-anisidine, ortho-chloroaniline and para-phenetidine. In the same manner the process of the invention applies to other arylamines such as: aniline; meta-toluidine; para-toluidine; ortho-toluidine; meta-chloroaniline; para-chloroaniline; ortho-chloroaniline; meta-bromoaniline; para-bromoaniline; ortho-bromoaniline; meta-anisidine; para-anisidine; ortho-anisidine; meta-phenetidine; para-phenetidine; ortho-phenetidine; 2,3-xylidine; 2,4-xylidine; 2,5-xylidine; 2,6-xylidine; 3,4-xylidine; 3,5-xylidine; ortho-aminoaniline; meta-aminoaniline; para-aminoaniline; meta-ethylaniline; para-ethylaniline; ortho-ethylaniline; ortho-iodoaniline; meta-iodoaniline; para-iodoaniline; ortho-tolidine; meta-tolidine; para-tolidine; alpha-naphthylamine; beta-naphthylamine; 1,2-naphthylene diamine; 1,4-naphthylene diamine; 1,5-naphthylene diamine; 1,6-naphthylene diamine; 1,7-naphthylene diamine; 1,8-naphthylene diamine; 2,3-naphthylene diamine; 2,6-naphthylene diamine; 2,4-dimethoxyaniline; 2,5-dimethoxy-4-chloraniline; ortho-(n-propoxy)aniline; meta - (n - propoxy)aniline; para - (n - propoxy)aniline; ortho - (isopropoxy)aniline; meta - (isopropoxy)aniline; para-(isopropoxy)aniline; ortho-(n-butoxy)aniline; meta-(n-butoxy)aniline; para - (n - butoxy)aniline; ortho - (1-methyl-1-propoxy)aniline; meta - (1 - methyl-1-propoxy)-aniline; para-(1-methyl-1-propoxy)aniline; ortho-(2-methyl-1-propoxy)aniline; meta-(2-methyl-1-propoxy)aniline; para-(2-methyl-1-propoxy)aniline; 1-amino - 2 - methoxynaphthalene; 1-amino-3-methoxynaphthalene; 1-amino-4-methoxynaphthalene; 1-amino-5-methoxynaphthalene; 1-amino-6-methoxynaphthalene; 1 - amino-7-methoxynaphthalene; 1-amino-8-methoxynaphthalene; 2-amino-1-methoxynaphthalene; 2-amino-3-methoxynaphthalene; 2-amino-4-methoxynaphthalene; 2-amino - 5 - methoxynaphthalene; 2-amino-6-methoxynaphthalene; 2-amino-7-methoxynaphthalene; 2-amino-8-methoxynaphthalene; 1-methyl-2-amino-naphthalene; 3 - methyl - 2 - aminonaphthalene; 4-methyl-2-aminonaphthalene; 5-methyl - 2 - aminonaphthalene; 6-methyl-2-aminonaphthalene; 7-methyl-2-aminonaphthalene; 8-methyl-2-aminonaphthalene; 2-methyl-1-aminonaphthalene; 3-methyl-1-aminonaphthalene; 4-methyl-1-aminonaphthalene; 5-methyl-1-aminonaphthalene; 6-methyl-1-aminonaphthalene; 7-methyl - 1 - aminonaphthalene; 8-methyl-1-aminonaphthalene; 1-amino - 2 - chloronaphthalene; 1-amino-3-chloronaphthalene; 1-amino-4-chloronaphthalene; 1-amino-5-chloronaphthalene; 1-amino-6-chloronaphthalene; 1-amino-7-chloronaphthalene; 1-amino-8-chloronaphthalene; 2-amino - 1 - chloronaphthalene; 2-amino - 3 - chloronaphthalene; 2-amino-4-chloronaphthalene; 2-amino - 5 - chloronaphthalene; 2-amino-6- chloronaphthalene; 2-amino-7-chloronaphthalene; 2-amino-8-chloronaphthalene. Acetoacetarylamides derived from any of the above arylamines can be used as stabilizers or inhibitors, such as acetoacetanilide, acetoacet-ortho-toluidide, acetoacetchloroanilide, acetoacet-para-phenetidide, acetoacet-ortho-anisidide and the like.

The acetoacetarylamide used as a stabilizer may be the amide of the same arylamine which it is to be used to stabilize. This is not necessary to the practice of the invention however, and an acetoacetarylamide derived from a different arylamine may be employed. If the acetoacetarylamide is derived from the same arylamine which it is to stabilize, the acetoacetarylamide can, if desired, be formed in situ by adding to the arylamine sufficient diketene to form the desired quantity of acetoacetarylamide in solution in the arylamine.

Acetoacetarylamides are normally solids and must be dissolved in the normally liquid arylamines. This is readily accomplished by adding the amide at ambient temperature, that is, at room temperature, and then stirring, agitating or otherwise circulating the arylamine to effect solution. The quantity of acetoacetarylamide employed is not critical except as to the minimum required. We have found that at least 0.01 part by weight of acetoacetarylamide per 100 parts by weight of arylamine is required for stabilization, with at least 0.05 part per 100 parts preferred. There is no upper limit on the quantity that can be employed, particularly if the arylamine is to be converted to an acetoacetarylamide and this acetoacetarylamide is used as a stabilizer, this being one of the particular advantages of using the acetoacetarylamide derived from the arylamine to be stabilized. In general, however, we have found that there is no appreciable increase in stability with proportions of acetoacetarylamide above 2.0 parts by weight of amide per 100 parts by weight of arylamine.

As will be seen in the examples, the invention stabilizes arylamines against discoloration when stored in the presence of light in either air or a nitrogen atmosphere. As is evidenced by the presence of metal strips in certain of the experiments in the examples, the arylamines stabilized according to the invention can be stored in metal containers as well as in containers of glass or other inert material. With steel containers a nitrogen atmosphere is somewhat preferred.

The problem of color instability in storing arylamines is shown in the following tables. To obtain the data for the tables, the arylamines were stored in clear glass containers at ambient temperatures. In some cases the atmosphere in the jars was air, in others nitrogen ($N_2$) as noted. The effect of storage in steel and stainless steel containers was simulated in some of the experiments by placing metal strips in the glass container. The solutions were analyzed for color on the Gardner scale, at the beginning of each test and at intervals up to 30 days. Arylamines which are red or dark red in color cannot be used to make satisfactory acetoacetarylamides for the reasons previously stated.

TABLE I

Compound tested: *ortho-toluidine*

| Experiment No. | Atmosphere | Metal Strip | Color in Gardner Units After— | | | |
|---|---|---|---|---|---|---|
| | | | 0 Days | 5 Days | 15 Days | 30 Days |
| 1 | Air | None | <1 | 1 | 4 | Dark red. |
| 2 | do | do | <1 | 2 | 4 | 9 (red). |
| 3 | $N_2$ | do | <1 | 2 | 2 | Do. |
| 4 | $N_2$ | do | <1 | 2 | 4 | Do. |
| 5 | $N_2$ | Steel | <1 | 2 | 5 | 16 (dark red). |
| 6 | $N_2$ | Stainless steel. | <1 | 6 | 12 | Dark red. |
| 7 | Air | Steel | <1 | 4 | 6 | Do. |

TABLE II

Compound tested: *para-phenetidine*

| Experiment No. | Atmosphere | Metal Strip | Color in Gardner Units After— | |
|---|---|---|---|---|
| | | | 0 Days | 7 Days |
| 8 | Air | None | <1 | 10 |

TABLE III

Compound tested: *ortho-anisidine*

| Experiment No. | Atmosphere | Metal Strip | Color in Gardner Units After Time in Days | | | |
|---|---|---|---|---|---|---|
| | | | 0 | 9 | 16 | 30 |
| 9 | Air | None | 4 | 7 | 8 | 13 (dark red). |
| 10 | $N_2$ | do | 4 | 7 | 8 | 12 (dark red). |

EXAMPLE I

In these experiments samples of ortho-toluidine, to which had been added various quantities of acetoacet-ortho-toluidide as a stabilizer, were stored in clear glass containers exposed to light at ambient temperatures. The atmosphere in the jars was air or nitrogen, as indicated. Where indicated a strip of steel was placed in the solution in the jar. The solutions were analyzed for color on the Gardner scale at the beginning of the test and at intervals up to 30 days. Results were as follows:

| Experiment No. | Weight percent concentration stabilizer | Atmosphere | Metal Strip | Color in Gardner Units After Time in Days | | | |
|---|---|---|---|---|---|---|---|
| | | | | 0 | 5 | 15 | 30 |
| 11 | 0.2 | Air | None | <1 | 2 | 3 | 7 (light red). |
| 12 | 0.2 | $N_2$ | do | <1 | 2 | 3 | 4 (yellow). |
| 13 | 0.1 | $N_2$ | do | <1 | 1 | 1 | 3 (yellow). |
| 14 | 1.0 | $N_2$ | Steel | <1 | 1 | 1 | Do. |

EXAMPLE II

Ortho-toluidine was stabilized with acetoacet-ortho-toluidide formed in situ by the reaction of diketene with ortho-toluidine. A stabilized solution was made by adding to ortho-toluidine sufficient diketene (0.4 percent) to obtain an inhibitor concentration of one weight percent of acetoacet-ortho-toluidide. The solution was stored for 34 days in a glass container exposed to light and air. The test solution had a color of less than one Gardner before the test and after 34 days the color was only 4 Gardner.

EXAMPLE III

This test was made to determine the effect of storing commercial ortho-toluidine, having a color of one Gardner, in a steel tank under an atmosphere of nitrogen and in the absence of light. To 5000 gallons of ortho-toluidine in such a tank under such conditions was added 50 pounds of acetoacet-ortho-toluidide. The mixture was circulated until solution was affected. After 30 days the color of the ortho-toluidine had increased to only 2 Gardner.

By contrast another test solution, kept under the same conditions but without any inhibitor, became red-colored after only 15 days, and hence unsuitable for use.

EXAMPLE IV

In these experiments, samples of ortho-toluidine, to which had been added various quantities of acetoacetanilide as a stabilizer, were stored in clear glass containers exposed to light at ambient temperatures. The atmosphere in the jars was air or nitrogen, as indicated. Where indicated a strip of metal was placed in the solution in the jar. The solutions were analyzed for color on the Gardner scale at the beginning of the test and at intervals up to 30 days. Results were as follows:

| Experiment No. | Weight percent concentration stabilizer | Atmosphere | Metal Strip | Color in Gardner Units After Time in Days | | | |
|---|---|---|---|---|---|---|---|
| | | | | 0 | 5 | 15 | 30 |
| 21 | 4.0 | Air | None | <1 | 1 | 1 | 3 (yellow). |
| 22 | 0.2 | do | do | <1 | 1 | 3 | 4 (yellow). |
| 23 | 0.2 | do | do | <1 | 2 | 3 | Do. |
| 24 | 0.1 | do | do | <1 | 3 | 3 | 3 (yellow). |
| 25 | 0.04 | do | do | <1 | 3 | 4 | 4 (yellow). |
| 26 | 0.2 | N₂ | do | <1 | 2 | 5 | 6 (yellow). |
| 27 | 0.2 | Air | Aluminum | <1 | 3 | 5 | 7 (light red). |
| 28 | 1.0 | N₂ | Steel | <1 | 2 | 4 | 6 (dark yellow). |

EXAMPLE V

In these experiments samples of ortho-anisidine, to which had been added various quantities of acetoacetanilide as a stabilizer, were stored in clear glass containers exposed to light at ambient temperatures. The atmosphere in the jar was air. Where indicated a strip of aluminum was placed in the solution in the jar. The solutions were analyzed for color on the Gardner scale at the beginning of the test and at intervals up to 30 days. Results were as follows:

| Experiment No. | Weight percent concentration stabilizer | Atmosphere | Metal Strip | Color in Gardner Units After Time in Days | | | |
|---|---|---|---|---|---|---|---|
| | | | | 0 | 9 | 16 | 30 |
| 31 | 0.2 | Air | None | 4 | 4 | 5 | 9 (light amber). |
| 32 | 2.0 | do | Aluminum | 4 | 5 | | 7 (light amber). |
| 33 | 2.0 | do | None | 4 | 6 | | 8 (light amber). |

EXAMPLE VI

In this experiment a sample or ortho-anisidine, to which had been added 2.0 weight percent of acetoacet-ortho-anisidide as a stabilizer, was stored in a clear glass container exposed to light at ambient temperature. The atmosphere in the jar was air and a strip of aluminum was placed in the solution in the jar. The solution was analyzed for color at the beginning of the test and at intervals up to 30 days. At the beginning of the test the solution had a color of 4 on the Gardner scale. After 9 days the color of the solution was 6 on the Gardner scale and at the end of the test the solution was amber in color, 10 on the Gardner scale, and the solution was still usable.

EXAMPLE VII

In this experiment a 4000 gram sample of ortho-chloroaniline, to which had been added 40 grams of acetoacet-ortho-chloroanilide as a stabilizer, was stored in a clear glass container exposed to light and air at ambient temperature. After 30 days storage under these conditions, there was no evidence of red color in the sample and the material was fit for use.

EXAMPLE VIII

In this experiment, a sample of paraphenetidine, to which had been added 0.5 weight percent of acetoacetanilide as a stabilizer, was stored in a clear glass container exposed to light and air at ambient temperatures for a period of seven days. At the beginning of the test, the sample had a color of less than one on the Gardner scale and at the conclusion of the test the color was only 4 on the Gardner scale.

EXAMPLE IX

In this experiment a sample of para-phenetidine, to which had been added 0.5 weight percent of acetoacet-para-phenetidide as a stabilizer, was stored in a clear glass container exposed to light and air at ambient temperatures for a period of seven days. At the beginning of the test the sample had a color of less than one on the Gardner scale and at the conclusion of the test the color was only 5 on the Gardner scale.

What is claimed is:

1. A process for the stabilization of an arylamine selected from the group consisting of aniline, phenylene diamine, naphthylamine, naphthyl diamines and ring-substituted arylamines of the above classes wherein the only substituents are selected from the group consisting of lower alkyl, lower alkoxy and halogen substituents, which comprises adding to said arylamine a sufficient quantity of diketene to form in situ, by the reaction of said diketene with a portion of said arylamine, an acetoacetarylamide in the amount of at least 0.01 part by weight of said acetoacetarylamide per 100 parts by weight of unreacted arylamine.

2. A process for the stabilization of nuclear substituted anilines, wherein the only substituents are lower alkyl substituents, which comprises adding to said alkyl substituted anilines a sufficient quantity of diketene to form in situ, by the reaction of said diketene with a portion of said aniline, an acetoacetanilide in the amount of at least 0.01 part by weight of acetoacetanilide per 100 parts by weight of unreacted aniline.

3. A process for the stabilization of nuclear substituted anilines, wherein the only substituents are lower alkoxy substituents, which comprises adding to said alkoxy substituted anilines a sufficient quantity of diketene to form in situ, by the reaction of said diketene with a portion of said anilines an acetoacetanilide in the amount of at least 0.01 part by weight of acetoacetanilide per 100 parts by weight of unreacted aniline.

4. A process for the stabilization of nuclear substituted anilines, wherein the only substituents are halogen substituents, which comprises adding to said halogen substituted aniline a sufficient quantity of diketene to form in situ, by the reaction of said diketene with a portion of said aniline, an acetoacetanilide in the amount of at least 0.01 part by weight of acetoacetanilide per 100 parts by weight of unreacted aniline.

5. A process for the stabilization of ortho-toluidine which comprises adding to said ortho-toluidine a sufficient quantity of diketene to form in situ, by the reaction of said diketene with a portion of said ortho-toluidine, acetoacet-orthotoluidide in the amount of at least 0.01 part by weight of acetoacet-ortho-toluidide per 100 parts by weight of ortho-toluidine.

6. A process for the stabilization of ortho-anisidine which comprises adding to said ortho-anisidine a sufficient quantity of diketene to form in situ, by the reaction of said diketene with a portion of said ortho-anisidine, acetoacet-ortho-anisidide in the amount of at least 0.01 part by weight of acetoacet-ortho-anisidide per 100 parts by weight of ortho-anisidine.

7. A process for the stabilization of ortho-chloroaniline which comprises adding to said ortho-chloroaniline a sufficient quantity of diketene to form in situ, by the reaction of said diketene with a portion of said ortho-chloroaniline, acetoacet-ortho-chloroanilide in the amount of at least 0.01 part by weight of acetoacet-ortho-chloroanilide per 100 parts by weight of ortho-chloroaniline.

8. A process for the stabilization of para-phenetidine which comprises adding to said para-phenetidine a sufficient quantity of diketene to form in situ, by the reaction of said diketene with a portion of said para-phenetidine, acetoacet-para-phenetidide in the amount of at least 0.01 part by weight of acetoacet-para-phenetidide per 100 parts by weight of para-phenetidine.

9. An arylamine selected from the group consisting of anilene, phenylene diamine, naphthylamine, naphthyl diamines and ring-substituted arylamines of the above classes wherein the only substituents are selected from the group consisting of lower alkyl, lower alkoxy and halogen substituents, stabilized by the presence of at least 0.01 part by weight of an acetoacetarylamide per 100 parts by weight of said arylamine, said acetoacetarylamide being the reaction product of diketene and an arylamine selected from the group consisting of aniline, phenylene diamine, naphthylamine, naphthyl diamines and ring-substituted arylamines of the above classes wherein the only substituents are selected from the group consisting of lower alkyl, lower alkoxy and halogen substituents.

10. A nuclear-substituted aniline, wherein the only substituents are lower alkyl substituents, stabilized by the presence of at least 0.01 part by weight of an acetoacetarylamide per 100 parts by weight of said aniline, said acetoacetarylamide being the reaction product of diketene and an arylamine selected from the group consisting of aniline, phenylene diamine, naphthylamine, naphthyl diamines and nuclear-substituted arylamines of the above classes wherein the only substituents are selected from the group consisting of lower alkyl, lower alkoxy and halogen substituents.

11. A nuclear-substituted aniline, wherein the only substituents are lower alkoxy substituents, stabilized by the presence of at least 0.01 part by weight of an acetoacetarylamide per 100 parts by weight of said aniline, said acetoacetarylamide being the reaction product of diketene and an arylamine selected from the group consisting of aniline, phenylene diamine, naphthylamine, naphthyl diamines and nuclear-substituted arylamines of the above classes wherein the only substituents are selected from the group consisting of lower alkyl, lower alkoxy and halogen substituents.

12. A nuclear-substituted aniline, wherein the only substituents are halogen substituents, stabilized by the presence of at least 0.01 part by weight of an acetoacetarylamide per 100 parts by weight of said aniline, said acetoacetarylamide being the reaction product of diketene and an arylamine selected from the group consisting of aniline, phenylene diamine, naphthylamine, naphthyl diamines and nuclear-substituted arylamines of the above classes wherein the only substituents are selected from the group consisting of lower alkyl, lower alkoxy and halogen substituents.

13. A nuclear-substituted aniline, wherein the only substituents are lower alkyl substituents, stabilized by the presence of at least 0.01 part by weight of an acetoacetanilide per 100 parts by weight of said aniline, said acetoacetanilide being the reaction product of said lower alkyl-substituted aniline and diketene.

14. A nuclear-substituted aniline, wherein the only substituents are lower alkoxy substituents, stabilized by the presence of at least 0.01 part by weight of an acetoacetanilide per 100 parts by weight of said aniline, said acetoacetanilide being the reaction product of said lower alkoxy-substituted aniline and diketene.

15. A nuclear substituted aniline, wherein the only substituents are halogen substituents, stabilized by the presence of at least 0.01 part by weight of an acetoacetanilide per 100 parts by weight of said anilide, said acetoacetanilide being the reaction product of said halogen-substituted aniline and diketene.

16. Ortho-toluidine stabilized by the presence of at least 0.01 part by weight of acetoacet-ortho-toluidide per 100 parts by weight of said ortho-toluidine.

17. Ortho-toluidine stabilized by the presence of at least 0.01 part by weight of acetoacetanilide per 100 parts by weight of said ortho-toludine.

18. Ortho-anisidine stabilized by the presence of at least 0.01 part by weight of acetoacet-ortho-anisidine per 100 parts by weight of said ortho-anisidine.

19. Ortho-anisidine stabilized by the presence of at least 0.01 part by weight of acetoacetanilide per 100 parts by weight of said ortho-anisidine.

20. Ortho-chloroaniline stabilized by the presence of at least 0.01 part by weight of acetoacet-ortho-chloroanilide per 100 parts by weight of said ortho-chloroaniline.

21. Para-phenetidine stabilized by the presence of at least 0.01 part by weight of acetoacet-para-phenetidide per 100 parts by weight of said para-phenetidine.

22. Para-phenetidine stabilized by the presence of at least 0.01 part by weight of acetoacetanilide per 100 parts by weight of said para-phenetidine.

References Cited in the file of this patent

UNITED STATES PATENTS

| | | |
|---|---|---|
| 1,982,675 | Law | Dec. 4, 1934 |
| 2,152,786 | Boese | Apr. 4, 1939 |
| 2,675,392 | Theobald | Apr. 13, 1954 |
| 2,714,117 | Lacey et al. | July 26, 1955 |

OTHER REFERENCES

Leuthardt et al.: Helvetica Chimica Acta, vol. 30 pp. 958 to 964 (1947).